United States Patent [19]
Chase, Sr.

[11] 3,778,636
[45] Dec. 11, 1973

[54] LINE-TYPE GENERATOR HAVING AN ACTIVE CHARGING CIRCUIT

[75] Inventor: Charles Elroy Chase, Sr., Auburndale, Mass.

[73] Assignee: Tachisto Inc., Auburndale, Mass.

[22] Filed: Dec. 3, 1971

[21] Appl. No.: 204,497

[52] U.S. Cl. .............................. 307/108, 307/109
[51] Int. Cl. ............................................. H03k 3/64
[58] Field of Search .................. 307/106, 108, 109; 313/149; 320/1

[56] References Cited
UNITED STATES PATENTS
2,411,140  11/1946  Lindenblad .................... 307/106 X
1,382,786  6/1921  Klonek ............................ 313/149

OTHER PUBLICATIONS
Pulse Generators McGraw Hill, 1948 (Glasoe & Le-Bacqz) p. 287 FIG. 8.5b (TK787208G5, copy in Scientific Library).

*Primary Examiner*—Robert K. Schaefer
*Assistant Examiner*—M. Ginsburg
*Attorney*—Douglas E. Whitney

[57] ABSTRACT

A line-type pulse generator having an active charging circuit to provide intermittent charging during the interpulse period, capable of infinite variations in pulse rate, an unexpectedly high charging efficiency, sequential charging of multiple energy-storage elements and subsequent discharge into independent loads, and complete elimination of misfiring. The switch of the active charging circuit may be provided by a dual rotary spark gap including, in particular, elements in common with the switch of the discharging circuit. Two rotary-spark-gap pulsers are described in detail.

10 Claims, 7 Drawing Figures

LINE-TYPE GENERATOR HAVING AN ACTIVE CHARGING CIRCUIT

BACKGROUND OF THE INVENTION

A pulse is a transient variation of electrical current or energy, usually of a repeated, constant value. A pulse generator is an electrical device capable of providing uniform pulses of a certain value at a desired rate. See generally Pulse Generators (G.N. Glasoe and J.V. LeBacqz, eds.) McGraw-Hill (1948); Dover edit. (1965). Pulse generators are useful as power sources for numerous electrical devices, including radar, pulsed X-ray and electron beam sources, and more recently various types of lasers.

Pertinent pulse generators are characterized by certain common features, illustrated schematically in FIG. 1. A high-voltage d-c power supply 1 delivers energy to an appropriate energy-storage element 2 through a charging element 3, which together form a charging circuit (1, 2 and 3). When fully charged, the energy-storage element 2 may discharge its energy as a pulse to load 4 by the closing of switch 5, which together form a discharging circuit (2, 4 and 5). The functions of charging element 3 are to isolate power supply 1 from load 4 when switch 5 is closed and to control the rate of charging element 2. Normally recharging of energy-storage element 2 begins immediately after the firing of the pulse, and continues for the entire duration of the interpulse period. Element 2 is shown as a capacitor, but it may instead by any other suitable energy-storage element such as a cable, delay line or pulse-forming network.

Pulse generators are divided into two types: hard-tube pulsers and line-type pulsers. The switch 5 of a hard-tube pulser is a switch tube controlled by a grid, which normally discharges only a fraction of the stored energy at once. The current-carrying capacity of the tube limits its suitability to applications requiring only low-power pulses. In hard-tube pulsers, charging element 3 is in practice a high-impedance element; but cf. *Pulse Generators, supra*, at pp. 21–22 and FIG. 2.1(a); where a non-synchronous switch is shown "only for convenience". The present invention involves line-type pulsers, wherein the entire stored energy is charged and discharged for each pulse. The switch 5 of a line-type pulser is either a spark gap or a gas-filled tube such as a thyratron or ignitron.

Thyratrons are generally employed in modern devices and universally used where high pulse rates are required. But thyratrons are expensive, in part because they require extensive ancillary equipment, and unsuitable in certain applications such as Marx generators, which would generate an unacceptably large heater-cathode voltage. It is a primary objective of this invention to obtain a pulse generator capable of the reliable, high pulse rate of the thyratron but at the same time being inexpensive and suitable for a wider range of applications.

Rotary-spark-gap pulse generators were in common use during World War II (see *Pulse Generators, supra*, pp. 273–94, 448–54), but have since been replaced by the thyratron-based generators.

A rotary spark gap comprises a set of moving electrodes mounted on a wheel rotating beside one or more fixed electrodes. The minimum spacing between the moving and fixed electrodes and the maximum voltage of the energy-storage element 2 are selected such that a breakdown voltage is achieved as the moving electrodes approach the fixed, thereby sparking the gap to close the discharging circuit. Through trail and error, satisfactory rotary-spark-gap designs have been obtained (see *Pulse Generators, supra*, pp. 276 et seq.). However, as the moving electrodes are at or near the minimum spacing immediately after sparking, a danger of misfiring exists, particularly since residual ionization remains in the gap vicinity for a period after the spark, which ionization lowers the breakdown voltage. Thus, as the moving electrodes approach and pass the fixed electrodes, it is essential that after sparking the electrode spacing and circuit characteristics prevent subsequent discharge during the same pulse cycle. In other words, the voltage of the energy-storage element 2 cannot rise so rapidly as to exceed the breakdown voltage between the electrodes until the electrodes have separated sufficiently, or else the gap will misfire by sparking a second (or even third) time. In any event, for a device of given characteristics, if the rotation rate is decreased eventually a point is reached where the gap remains sufficiently close to misfire. This limitation inherent in prior rotary-spark-gap generators limited their operation in practice either to a fixed pulse rate or, at best, to a variable pulse rate of limited range. Moreover, in some applications, component size would be prohibitively large for variable rates, and only a fixed rate is possible. It is a further objective of this invention to provide a rotary-spark-gap pulse generator variable in pulse rate down to zero.

BRIEF DESCRIPTION OF THE INVENTION

The present invention in its broad aspects incorporates the principle of "active charging" in the charging circuit whereby a switch can be closed in that circuit at any chosen time. This principle permits charging to be initiated at a certain point in the pulsing sequence, independently of the pulse rate. It also permits impulsive or other charging during the interpulse period at any desired pulse rate, rather than charging at a certain time (usually after a fixed interval) determined by charging circuit characteristics. Accordingly, in embodiments employing a rotary spark gap, it is readily possible to defer charging of the energy-storage element until the gap spacing in the discharging circuit is sufficiently large to preclude misfiring.

Thus in the present pulse generator an active element such as a switch is incorporated into the charging circuit to supplement (or in part to supplant) the conventional passive elements such as resistors or inductors. By so doing and by suitable modification of the passive elements, the charging cycle can be restricted to any desired portion of the interpulse period.

In a preferred embodiment, the present invention employes a dual rotary-spark-gap, a single device of novel construction, acting both as the switch (between moving electrodes and a set of fixed electrodes) in the charging circuit, as well as the switch (between moving electrodes and an additional set of fixed electrodes) in the discharging circuit. The particular advantage of this construction is that by appropriate electrode design and placement a certain charging-discharging pulse sequence and timing may be obtained and maintained throughout a wide frequency range—by the simple expedient of varying the revolution speed. As mentioned above, such variation was not heretofore possible with rotary spark gaps because of their inherent limitations.

It should be noted, however, that the invention may be employed, in addition to rotary-spark-gap pulsers, in other applications where the danger of premature charging or discharging exists. Moreover, in comparison with conventional pulse generators, the present invention permits at once advantages in both flexibility and economy.

BRIEF DESCRIPTION OF THE DRAWINGS

The general principles of pulse generators and the present invention, as well as the preferred embodiments, are illustrated in the drawings, wherein.

DETAILED DESCRIPTION OF THE INVENTION

Figure 1:
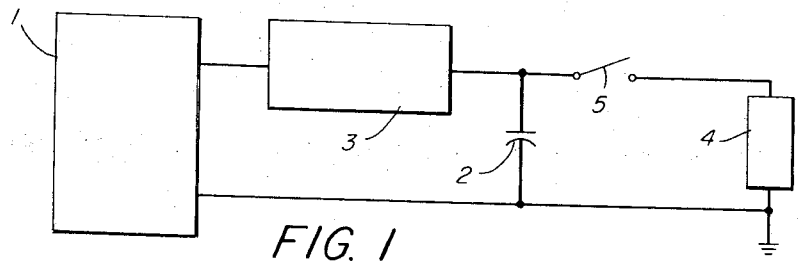
FIG. 1 is a schematic drawing of a pulse generator circuit.

In the present invention an active element is incorporated into the charging circuit of a pulse generator, which element operates in synchronism with the discharge switch to permit a charging waveform of a duration less than the interpulse period. Thus the charging can initiate at any point in the interpulse period and proceed for any desired portion thereof—from an instantaneous impulsive charging of short duration to extended charging up to the entire interpulse period. In any case, of course, the passive charging elements (which may also be variable) are selected for cooperative operation with the active element.

In its broad aspects, the present invention is directed to a line-type pulse generator comprising (1) a charging circuit including a d-c power supply, passive charging elements, an active charging element and an energy storage element; and (2) a discharging circuit including said storage element, a discharging switch and load terminals; wherein synchronous means are provided for alternately actuating said active charging element and said switch.

In preferred embodiments, the discharging switch is a rotary spark gap and the active charging element is activated by the rotation of the switch. In another preferred embodiment, as detailed herein, the active charging element and the discharging switch are integrally incorporated in a dual rotary-spark-gap device having movable electrodes and one set of fixed electrodes connected in said charging circuit and a second set of fixed electrodes connected in said discharging circuit.

The active charging element has certain electrical characteristics: it must be able to hold off circuit voltage (i.e. from the power supply to the storage element) when open and to carry the peak charging current when closed. These characteristics are not so demanding as those for a spark gap discharging switch, which must be capable of closing with precision to discharge the storage element power in pulse form and of tolerating the discharge. Moreover, since the pulse duration of the discharge is ordinarily only a minute fraction of the pulse period, and consequently since the interpulse period is much greater, the charging cycle can be made longer than the firing cycle, and (with appropriate resistance or inductance in the charging circuit) the average charging current can be proportionately less than the discharging current. Thus the active charging element may be (1) sliding or rolling contacts on a wheel having alternately conducting and insulating sectors; (2) brushes; (3) a hard-tube switch (particularly useful for relatively low-power pulsers that can tolerate long charging cycles) controlled by a grid voltage derived from the discharging switch by way of mechanical contacts, magnetic pickup, optical sensors or the like; or (4) spark gaps, which would lead to impulsive charging of the storage element.

In any case, the active charging element is synchronized with the discharge switch so as to close the charging circuit during some certain interval of the interpulse period and to open the circuit during any desired portion of the overall period. Consequently, by keeping the charging circuit open during the period when undesired discharge is possible, misfiring is precluded. Each of the elements specified above may be readily synchronized. Thus the grid voltage of a hard-tube switch may be derived from the rotation of a rotary spark gap, and a spark-gap element may constitute an integral part of a rotary-spark-gap pulse switch.

Figure 2:
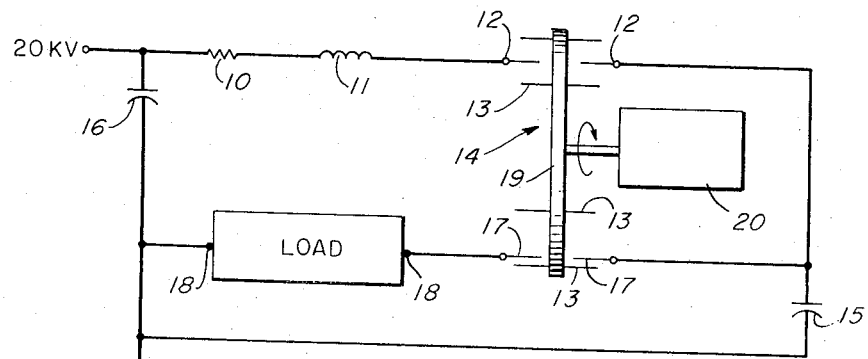
FIG. 2 is a circuit diagram of a rotary-spark-gap pulse generator incorporating the present invention.
Figure 3:
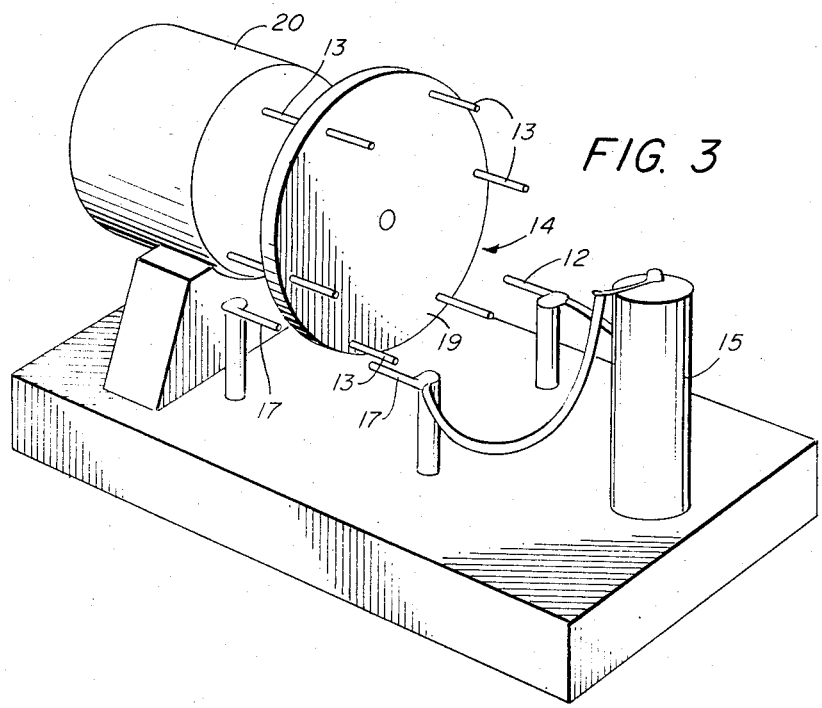
FIG. 3 is a drawing in perspective of a simple device having the circuit of FIG. 2.

FIGS. 2 and 3 illustrate a rotary-spark-gap pulse generator constructed to embody the present invention, FIG. 2 being the circuit diagram thereof and FIG. 3 being the perspective drawing of certain elements. The charging circuit of the device includes a d-c power supply (not shown) of 20 kV, passive charging elements consisting of a 400 ohm resistor 10 and 200 $\mu$H inductor 11, and active charging element consisting of a set of fixed electrodes 12 and moving electrodes 13 of rotary spark gap 14, and a 0.005 $\mu$f capacitor 15 as an energy storage element. Also in the charging circuit is capacitor 16, 0.1 $\mu$f at 25 kV, across the d-c power supply in order to assure that voltage will not drop more than 5 percent during impulsive charging. The charging circuit is characterized by a waveform critically damped with a rise time of about 1 $\mu$ sec. The power dissipated in resistor 10 under these conditions is 0.25 $CV^2$ or 90 watts at 180 Hz. The discharging circuit of the device includes storage element 15, a discharging switch consisting of a set of fixed electrodes of and moving electrodes 13 or rotary spark gap 14 and load terminals 18. Rotary spark gap 14 is constructed of a 7-inch diameter wheel 19 having six equally spaced moving electrodes 13. The rotary spark gap 14 is driven by a 1725 rpm motor 20, providing a pulse rate (at six pulses per revolution) variable continuously from zero to 180 Hz. For simplicity, resistor 10, inductor 11, capacitor 16 and load terminals 18 are not shown in FIG. 3.

The rotary-spark-gap construction shown in the embodiments herein is a parallel-pin gap, double gap with an insulating rotor, analogous to that shown as FIG. 8.5(b) of *Pulse Generators*, supra. It is believed within the skill of the art, in view of the present disclosure, to modify the other types shown in that reference in order to obtain analogous rotary spark gaps suitable for the present invention.

Figure 4:
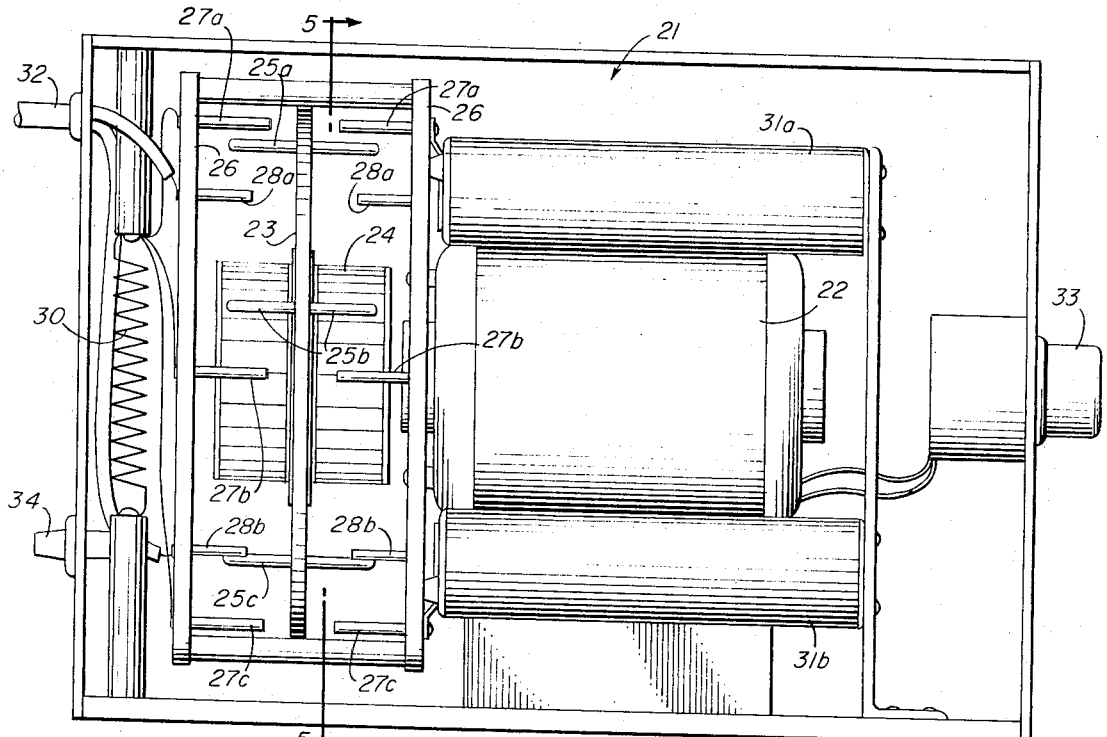
FIG. 4 is an elevation view, partly in cross-section, of a more detailed device, a preferred embodiment of the invention utilizing a dual rotary-spark-gap device for charging and discharging.
Figure 5:
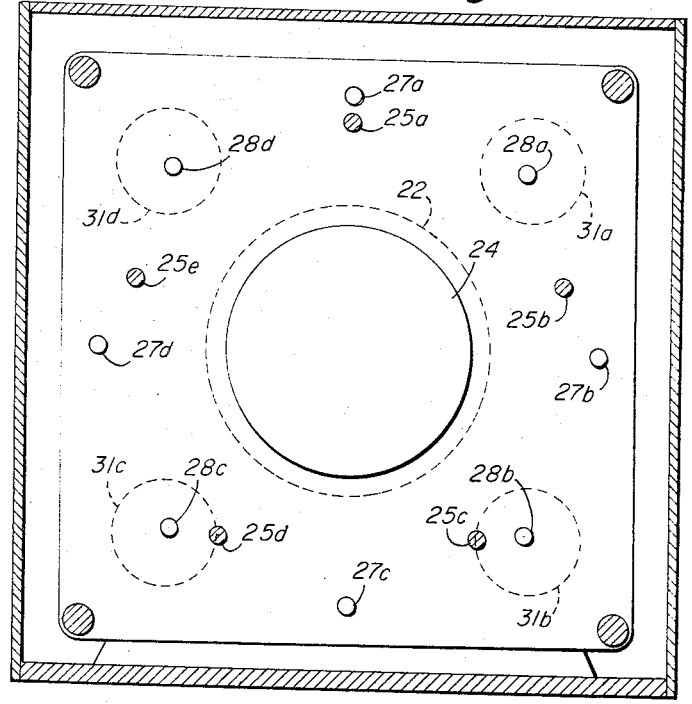
FIG. 5 is an elevation view, partly in cross-section, of the device of FIG. 4, taken along line 5—5 thereof.
Figure 6:
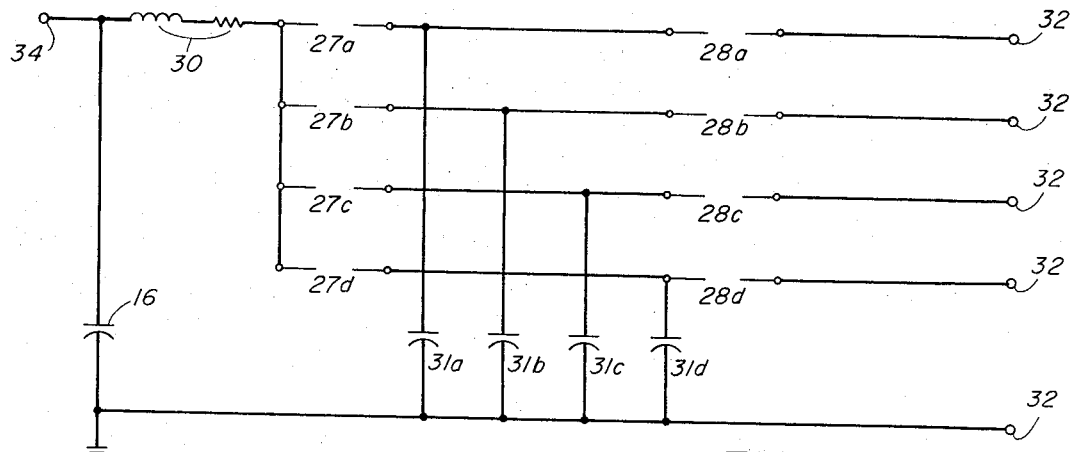
FIG. 6 is a drawing of a circuit diagram of the pulse generator illustrated in FIGS. 4 and 5.

FIGS. 4-6 illustrate a somewhat more elaborate embodiment of the present invention, FIGS. 4 and 5 being elevation views of the device, and FIG. 6 being its circuit diagram. Rotary-spark-gap pulse generator 21 includes motor 22 which drives wheel 23 including fans 24. Equally spaced around wheel 23 are five sets of moving electrodes 25 a–e. Within electrode mounting 26, spaced symmetrically, are four sets of fixed charging electrodes 27 a–d and fixed firing electrodes 28 a–d.

Figure 7:
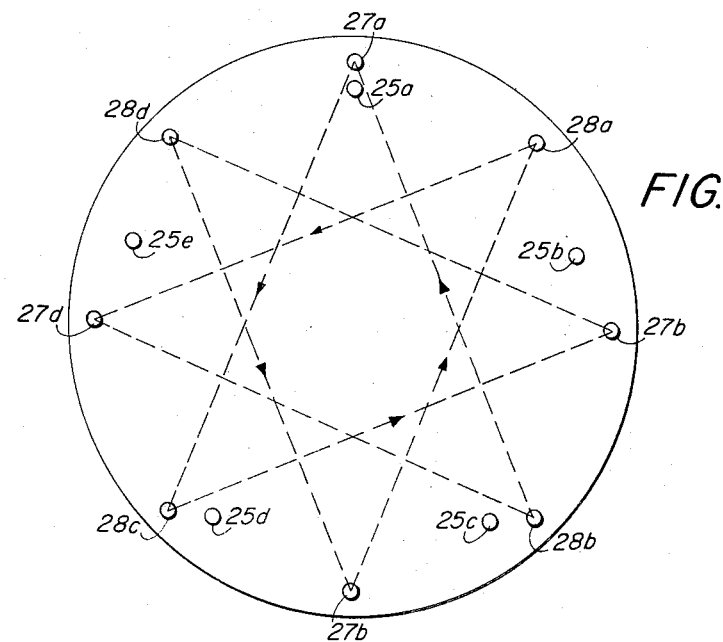
FIG. 7 is a schematic drawing of the fixed and moving electrodes of the device as shown in FIG. 5, showing the firing sequence of the sparks.

In the illustrated position moving electrodes 25a are within the minimum spacing distance from fixed charging electrodes 27a. The firing sequence, shown in FIG. 7, then is as follows: 25a–27a; 25d–28c; 25b–27b; 25e–28d; 25c–27c; 25a–28a; 25d–27d; 25b–28b; 25e–27a .... Thus, the firing sequence of moving electrodes 25 a–e is a d b e c a ...; of charging electrodes 27 a–d, a b c d a ...; and of firing electrodes, c d a b c ....

Pulse generator 21 includes as a charging circuit a power supply (not shown), passive charging elements 30, an inductor-resistor, the combined fixed charging electrodes 27 a–d and moving electrodes 25 a–e as an active charging element, and four capacitors 31 a–d. The discharging circuit includes capacitors 31 a–d, the combined fixed firing electrodes 28 a–d and moving electrodes 25 a–e as a discharging switch, and output terminals 32. Variac 33 is employed to change the pulse rate, when desired; and other devices such as switches may be added to provide for single or multiple loads, or the like. Power supply input leads 34 are also shown, although the power supply is not.

The combination of five moving electrodes, four fixed charging electrodes and four fixed firing electrodes produces 20 pulses per revolution, or a pulse rate of 1200 Hz at 3600 rpm. With a 10,000 rpm motor 22, a pulse rate may be obtained of up to 3000 Hz. In the constructon shown, fans 24 provide cooling and aid in deionization of the gaps between the moving and fixed electrodes. The energy storage elements, namely capacitors 31 a–d, each have a capacitance of 0.005 $\mu f$ at 30 kV.

The embodiment illustrated in FIGS. 4-7 obtains numerous advantages. Each capacitor 31 a–d fires only every fourth pulse, whereby capacitor life is substantially extended in the long run. This arrangement is far cheaper than the use of a single capacitor, since the expected lifetime (in total number of pulses) decreases as the pulse rate increases. Since, in the construction shown, the four capacitors 31 a–d are independent, appropriate output connection can be made with terminals 32, so as to use the device in any of the following ways: (a) to drive a single load at any pulse rate up to the maximum permitted by motor speed, (b) to drive two loads alternately at half rate or (c) to drive four loads sequentially at quarter rate. Moreover, since the values of the capacitors 31 a-d need not be the same, it is possible to deliver pulses of different power to separate loads. This feature provides great economy, for example, if several lasers or other devices are to be driven at the same pulse rate. It is of course within the skill of the art to extend this concept to any number of independent circuits (i.e. charging-storage-firing). Also, by appropriate variation in the number of spacing of moving or fixed electrodes, it is possible further: (a) to increase the pulse rate, (b) to fire two or more circuits simultaneously and (c) to obtain still further permutations and advantages. This is all possible because the use of a synchronized active charging element permits not only an infinite range of pulse rates but also the isolation of the energy storage element from the power supply, which in turn makes possible sequential charging of any desired number of types of storage elements from a single power supply and discharging thereof into one or more independent loads.

In the devices of the present invention, because the length of the charging cycle can be independent of the length of the interpulse period, it is possible to introduce a further refinement in the charging circuit. Instead of purely resistive charging, which is inherently limited to 50 percent efficiency, charging is feasible through a series combination of a resistor $R_c$ and an inductor $L_c$, the values of which are such that the charging circuit is critically damped. This condition gives the fastest possible energy transfer without overshoot, and occurs when $$R_c = 2 \ \sqrt{L_c/C_s};$$

where $C_s$ is the capacitance of the energy storage element. The total length of the charging cycle is proportional to $1/\sqrt{L_c C_s}$, and can be varied independently by changing $R_c$ and $L_c$ together so that Eq. (1) is always satisfied. The values $R_c = 400$ ohms, $L_c = 200\ \mu H$, and $C_s = 0.005\ \mu f$ used in the second embodiment of the rotary-spark-gap pulser are one set of values satisfying Eq. (1).

The advantage of charging through such a circuit is that the energy dissipated in the charging circuit per pulse is only $0.25 C_s V^2$, instead of $0.5 C_s V^2$ as with resistive charging, and the charging efficiency can thus be raised to a theoretical limit of 66⅔ percent. Although still not as efficient as resonant charging, this circuit allows flexibility in repetition rate which resonant charging cannot achieve. In any case, of course, resonant charging is also possible if desired, with the present devices.

I claim:

1. A line-type pulse generator comprising:
   a charging circuit including a d-c power supply having a certain voltage, passive charging elements, an active charging element and an energy storage element;
   a discharging circuit including said storage element, a discharging switch and load terminals; and means for operating said charging and discharging circuits including synchronous means for alternately (a) actuating said active charging element to charge said energy storage element to said voltage and (b) actuating said discharging switch.

2. The pulse generator of claim 1, wherien said switch is of a rotary spark gap type.

3. The pulse generator of claim 2, wherein said active charging element is a part of a charging switch activated by rotation of said rotary spark gap.

4. The pulse generator of claim 1, wherein said active charging element and said switch are integrally incorporated in a dual rotary-spark-gap device having movable electrodes and one set of fixed electrodes connected in said charging circuit and a second set of fixed electrodes connected in said discharging circuit.

5. The line-type pulse generator of claim 1, wherein said synchronous means connects electrically said power supply with said energy storage element only during the interpulse period between discharges of said energy storage element.

6. The pulse generator of claim 5, wherein said active charging element of said switch are integrally incorporated in a dual rotary-spark-gap device having movable electrodes and one set of fixed electrodes connected in said charging circuit and a second set of fixed electrodes connected in said discharging circuit.

7. In a line-type pulse generator having a d-c power supply and an energy storage element and employing a spark gap discharge switch, an apparatus comprising:
a switch, means whereby said switch is capable of electrically connecting or disconnecting the power supply and the energy storage element; and
means for regulating said last mentioned switch so as to completely disconnect the power supply from the energy storage element during and immediately after the firing of the spark gap and to connect the power supply and the energy storage element during a preselected part of the interpulse period.

8. A rotary-spark-gap pulse generator comprising:
an energy storage element, a rotor, one or more moving electrodes mounted on said rotor;
one or more fixed discharge electrodes so positioned that the motion of said rotor carries said moving electrodes proximately past said fixed discharge electrodes, and means whereby a spark discharge of said storage element to a load is obtained when said moving and fixed discharge electrodes are proximate;
a d-c power supply suitable for charging said storage element; and
one or more fixed charging electrodes electrically connected to said power supply and so positioned that the motion of said rotor carries said moving electrodes proximately past said charging electrodes, and means whereby a spark charging of said storage element is obtained at a time intermediate the discharge of same.

9. A line-type pulse generator comprising:
A charging circuit including a high voltage d-c power supply, passive charging elements, an impulsive charging element and an energy storage element;
a discharging circuit including said storage element, a discharging switch and load terminals; and
means for operating said charging and discharging circuits including synchronous means for alternately actuating said impulsive charging element and said discharging switch.

10. The pulse generator of claim 9, wherein said impulsive charging element and said switch are integrally incorporated in a dual rotary-spark-gap device having movable electrodes and one set of fixed electrodes connected in said charging circuit and a second set of fixed electrodes connected in said discharging circuit.

* * * * *